United States Patent [19]

Fauss et al.

[11] 4,442,279

[45] Apr. 10, 1984

[54] COMPOSITIONS CONTAINING ISOCYANATOSILANES AS ADDITIVES TO INCREASE THE STABILITY IN STORAGE OF COMPOSITIONS CONTAINING POLYURETHANE PREPOLYMERS WITH FREE ISOCYANATE GROUPS

[75] Inventors: Rudolf Fauss, Cologne; Michael Sonntag, Odenthal; Kuno Wagner, Leverkusen; Kurt Findeisen, Odenthal; Gerhard Mennicken, Leverkusen, all of Fed. Rep. of Germany

[73] Assignee: Bayer Aktiengesellschaft, Bayerwerk, Fed. Rep. of Germany

[21] Appl. No.: 460,338

[22] Filed: Jan. 24, 1983

[30] Foreign Application Priority Data

Feb. 6, 1982 [DE] Fed. Rep. of Germany ....... 3204128

[51] Int. Cl.³ ............................................. C08G 18/00
[52] U.S. Cl. ....................................... 528/44; 528/67; 252/182; 260/453 SP
[58] Field of Search ................. 260/453 SP; 252/182; 528/44, 67

[56] References Cited

U.S. PATENT DOCUMENTS

| | | | |
|---|---|---|---|
| 3,366,630 | 1/1968 | Schinzel et al. | 260/240 |
| 3,479,325 | 11/1969 | Blomeyer et al. | 260/77.5 |
| 3,706,778 | 12/1972 | Hagemann | 260/455 |
| 3,759,975 | 9/1973 | Reüsche et al. | 260/465 |
| 4,308,071 | 12/1981 | Gervase | 106/193 |

FOREIGN PATENT DOCUMENTS 848462 8/1970 Canada.
1488647 10/1977 United Kingdom.

OTHER PUBLICATIONS

J. Org. Chem. 30 (1965), pp. 4306 & 4307, Reaction of Oxalyl Chloride with Amides, Speziale, et al.

*Primary Examiner*—Melvyn I. Marquis
*Attorney, Agent, or Firm*—Gene Harsh; Joseph C. Gil; Thomas W. Roy

[57] ABSTRACT

The present invention is related to compositions containing isocyanatosilanes as additives to increase the stability in storage of liquid or pasty, clear or pigmented compositions containing polyurethane prepolymers with free isocyanate groups and optionally containing solvents.

6 Claims, No Drawings

COMPOSITIONS CONTAINING ISOCYANATOSILANES AS ADDITIVES TO INCREASE THE STABILITY IN STORAGE OF COMPOSITIONS CONTAINING POLYURETHANE PREPOLYMERS WITH FREE ISOCYANATE GROUPS

BACKGROUND OF THE INVENTION

1. Field of the Invention

The present invention relates to compositions containing isocyanato-silanes as additives to increase the storage stability of liquid or pasty compositions containing polyurethane prepolymers with free isocyanate groups.

2. Description of the Prior Art

In German Patent No. 1,245,590 it has been disclosed to use highly reactive sulphonyl isocyanates, in particular tosyl isocyanate, as water binding agents in preparations containing polyurethane prepolymers with free isocyanate groups.

The use of such highly reactive monoisocyanates in lacquer systems has hitherto been the most advantageous means, for example, of preventing any undesirable side reactions with water possibly still present in the solvents or pigments. In practice, however, the use of tosyl isocyanate as an additive for lacquer compositions also entails disadvantages, as disclosed in German Offenlegungsschrift No. 2,539,728.

Thus commercial tosyl isocyanate occasionally contains traces of tosyl chloride which is also formed in the course of the preparation of tosyl isocyanate and which may give rise to unpleasant odors accompanying the use of tosyl isocyanate. Furthermore, the tosyl amide formed as a result of the reaction of tosyl isocyanate with water is liable to cause stippling in the lacquer due to the pronounced tendency of tosyl amide to undergo crystallization. In addition, tosyl amide often has a reaction inhibiting effect on polyurethane lacquer compositions.

Handling of tosyl isocyanate, which is a highly reactive compound, requires certain safety measures. Contact of tosyl isocyanate with pure water must be prevented as it may lead to an extremely vigorous reaction.

German Offenlegungsschrift No. 2,539,728 therefore recommends the use of certain alkoxycarbonyl isocyanates instead of tosyl isocyanate.

The disadvantage of alkoxycarbonyl isocyanates lies in the difficulty of their methods of preparation, for the most part requiring expensive starting materials. Thus in the process according to J. Org. Chem. 30 (1965), pages 4306 to 4307, preparation of the alkoxycarbonyl isocyanates requires the reaction of a previously prepared N-unsubstituted urethane with oxalyl chloride. The process according to German Auslegeschrift No. 1,793,088 requires the use of chlorocarbonyl isocyanate and the processes according to German Offenlegungsschrift No. 1,900,755 and German Auslegeschrift No. 1,768,179 require the use of chlorocarbonyl-isocyanide dichloride.

It was therefore an object of the present invention to provide an effective, easily available waterbinding additive for preparations containing polyurethane prepolymers with free isocyanate groups, which would not have the disadvantages mentioned above.

It has now surprisingly been found that isocyanatosilanes satisfy the requirements mentioned above.

The good drying effect of the isocyanato-silanes to be used according to the invention was not obviously to be expected since many representatives of this class of substances, e.g. trimethyl-isocyanatosilane, react only very slowly with water.

The reaction with water, for example in the case of dimethyldiisocyanatosilane, gives rise to polysiloxanes. These end products are constituents of mold release agents so that when prepolymers containing silyl isocyanate were subsequently used as lacquers, problems with adherence of the lacquers would be expected to arise.

It was surprisingly found, however, that isocyanatosilanes are excellent drying agents in isocyanate prepolymers and do not have the last mentioned disadvantage.

SUMMARY OF THE INVENTION

The present invention relates to a liquid or pasty, clear or pigmented composition containing
(a) a polyurethane prepolymer having free isocyanate groups,
(b) an isocyanatosilane in an amount sufficient to increase the storage stability of the composition and, optionally,
(c) a solvent which is inert towards isocyanate groups.

DETAILED DESCRIPTION OF THE INVENTION

The use of these substances has the following advantages over the customary use of sulphonyl- or alkoxycarbonyl-isocyanates for the same purpose:

1. Synthesis of the compounds is simple and may be achieved, for example, by the reaction of silyl halides with alkali metal cyanates as described, e.g. in German Offenlegungsschrift No. 1,695,741 or as described by W. Noll in "Chemie and Technologie der Silicone", published by Verlag Chemie, Weinheim, 2nd Edition (1968), pages 98–100.

2. The preparation of formulations of pigmented, moisture-hardening, one-component lacquers which have a stable viscosity can be achieved with a much smaller quantity of additive if, for example, trimethyl-isocyanatosilane and/or dimethyl-diisocyanatosilane is used instead of tosylisocyanate or isooctyl oxycarbonyl isocyanate.

3. Isocyanatosilanes are simpler to handle from a safety point of view. If, for example, concentrated trimethylisocyanatosilane or dimethyldiisocyanatosilane is inadvertently brought into contact with water, this does not result in a vigorous reaction such as would occur in the case of concentrated tosyl isocyanate. In the case of trimethyl-isocyanatosilane, the reaction is even considerably slower than in the case of alkoxycarbonyl isocyanates.

4. When the long term stabilizing effect is tested, liquid samples are found to be substantially improved in the stability of their viscosity, determined in DIN cup 4 according to DIN 53 211, both when stored at room temperature (20° C.) and when stored at elevated temperature (50° C.) if isocyanatosilanes are used instead of tosyl isocyanate.

5. Saponification of isocyanatosilanes does not give rise to any products with any undesirable effects in the lacquer (e.g. stippling).

6. Saponification products of the isocyanatosilanes have virtually no inhibitory effect on the hardening reaction of the lacquer composition. Due to the small quantity in which the additive is used, a smaller quantity of foreign bodies is also introduced into the lacquer composition, and this has a positive effect on many characteristics, e.g. on the water resistance or migration.

Any isocyanatosilanes may be used according to the invention, but it is preferred to use isocyanato-silanes corresponding to the formula

$$R_nSi(NCO)_{4-n}$$

wherein

R denotes an alkyl group having 1 to 6 carbon atoms, in particular a methyl group, and n represents 0 or an integer from 1 to 3, preferably 2 or 3.

Mixtures of various such isocyanatosilanes may, of course, also be used. Typical examples of suitable isocyanatosilanes include tetraisocyanatosilane, methyl-triisocyanatosilane, n-hexyl-triisocyanatosilane, methylethyl-diisocyanatosilane, dimethyl-diisocyanatosilane and trimethyl-isocyanatosilane. The last two mentioned silanes are particularly preferred.

The preparations containing polyurethane prepolymers with free isocyanate groups which are required to be stabilized according to the invention are liquid or pasty, clear or pigmented systems which may contain solvents and, optionally, also contain other auxiliary agents and additives conventionally used in lacquer technology, the main component or binder of these systems being polyurethane prepolymers with free isocyanate groups. The polyurethane prepolymers with free isocyanate groups are the known reaction products obtained from organic polyisocyanates with subequivalent quantities of polyhydroxyl compounds. The preparations to be stabilized according to the invention are primarily one-component polyurethane lacquers containing such prepolymers as binders, for example of the type described in German Patent No. 1,245,590 or U.S. Pat. No. 3,479,325, incorporated herein by reference. When used according to the invention, the additives according to the invention may, for example, be added to the finished preparations (one-component lacquers) or to the starting materials used for their preparation (pigments, solvents or binders). The quantity of additive to be used according to the invention depends primarily on the water content of the preparations which are to be stabilized or on that of the separate components used for their preparation. It is generally in the region of from about 0.05 to 5% by weight, preferably from about 0.5 to 4% by weight, based on the total weight of the preparations ready for use (one-component lacquers).

In certain special cases, it may be advisable if, in addition to the isocyanatosilanes which are essential to this invention, sulphonylisocyanates of the type mentioned in German Patent No. 1,245,590, in particular p-tolylsulphonylisocyanate (tosyl isocyanate) is added in the quantities indicated in German Patent No. 1,245,590 to the preparations which are to be stabilized or to the individual components used for their preparation.

If, for example, tosyl isocyanate and dimethyl-diisocyanatosilane are mixed in approximately equal parts by weight, the mixture is capable of easily stabilizing even a highly reactive lacquer system but the mixture is much safer to handle than tosyl isocyanate alone owing to its much weaker reactivity with pure water.

The additives according to the invention provide the possibility of increasing the viscosity stability or stability in storage of liquid or pasty, solvent-free or solvent-containing, clear or pigmented polyurethane prepolymer preparations containing free isocyanate groups. The preparations stabilized according to the invention are preferably the known solvent-containing one-component polyurethane lacquers described and exemplified in German Patent No. 1,245,590 and in U.S. Pat. No. 3,479,325.

The advantages obtained by the use according to the invention will also be seen from the examples which follow.

In the following examples of practical application 1A to 5C, the effect of trimethyl-isocyanatosilane (V) and-/or dimethyl-diisocyanatosilane(IV) as stabilizing agent is compared with the effect of tosyl isocyanate (III) or isooctyloxycarbonylisocyanate (XVII). The numerical date given in the descriptions of formulations represent parts by weight.

The following materials were used in the examples:

I: 60% solution of an isocyanate prepolymer having an isocyanate content of 5.4% in xylene (based on the solution) and prepared by the reaction of 7.0 mol of 2,4-diisocyanatotoluene with a mixture of 1.8 mol of trimethylolpropane, 0.9 mol of diethyleneglycol and 0.9 mol of polypropylene glycol having a molecular weight of 1000

II: 85% solution of a commercial coal tar (VFT Spezialteer 250/500 of Verkaufsvereinigung für Teererzeugnisse AG, Essen, Germany) in xylene III: tosyl isocyanate IV: dimethyl-diisocyanatosilane V: trimethyl-isocyanatosilane VI: commercial deaerating agent based on polyacrylate (®Blister Free 66, Schwegmann KG, Bonn, Germany) 10% solution in ethylene glycol monoethylether acetate VII: antisedimentation agent (®Bentone 34, Kronos Titan GmbH, Leverkusen, Germany) (aluminum silicate of the montmorillonite type), 10% suspension in xylene VIII: talcum IX: synthetic iron oxide pigment (Bayferrox ® 130 BM, Bayer AG, Leverkusen, Germany)

X: micaceous iron ore (Eisenglimmer A/S, Kärntner Montanindustrie GmbH, Austria) (crystalline lamellar haematite)

XI: non-floatint aluminum bronze (Aliminiumbronze Stapa 2, Eckart-Werke, Fürth, Germany) ca. 40% in xylene XII: hydrocarbon solvent mixture with an aromatic hydrocarbon content of 97% and a boiling range of 165° C. to 178° C. (Solvent Naphtha 100, British Petroleum)

XIII: xylene

XIV: ethylene glycol monoethylether acetate

XV: 60% solution in ethyl glycol monoethylether acetate/xylene (1:1) of a reaction product of 75 parts by weight of a biuretized hexamethylenediisocyanate having an isocyanate content of 22% by weight with 25 parts by weight of a polyester based on 5 ml of phthalic acid anhydride, 1 mol of trimethylol propane and 5 mol of hexamethylene glycol. The reaction product was prepared from the starting materials by heating for 2 hours at 80° C. It has an isocyanate content of 9.5%.

XVI: 10% solution of dibutyl tin dilaurate in ethylene glycol monoethylether acetate XVII: isooctyl oxycarbonyl isocyanate XVIII: silicone resin as surface finish (Byk 303, Byk Mallinckrodt, Wesel, Germany)

XIX: defoaming agent for organic systems (Byk 141, Byk Mallinckrodt, Wesel, Germany)

XX: commercial titanium dioxide pigment (R-KB-4, Bayer AG, Leverkusen, Germany (rutile type)

Examples 1A to 3C summarized in Table 1 demonstrate the stabilization of a pigmented isocyanate prepolymer containing aromatically bound isocyanate groups. The starting materials indicated were mixed for 15 minutes, using a high speed stirrer. The temperature of the mixture rises to about 50° C. during this operation. The first viscosity determination was carried out according to DIN 53019 after the mixture had cooled to 23° C. Further viscosity determinations at 23° C. were carried out after storage for 16 hours at 80° C. and/or after 7 days at 50° C. The results are summarized in Table 1. Omission of stabilizing agent III, IV or V leads to gelling in all three of the different formulations.

TABLE 1

| Example | 1 A | 1 B | 1 C | 2 A | 2 B | 2 C | 3 A | 3 B | 3 C |
|---|---|---|---|---|---|---|---|---|---|
| I | 38.13 | 38.13 | 38.13 | 28.22 | 28.22 | 28.22 | 35.79 | 35.79 | 35.79 |
| II | | | | 20.20 | 20.20 | 20.20 | | | |
| III | 2.59 | | | 1.92 | | | 1.67 | | |
| IV | | 2.59 | | | 1.92 | | | 1.67 | |
| V | | | 2.59 | | | 1.92 | | | 1.67 |
| VI | 0.23 | 0.23 | 0.23 | 0.36 | 0.36 | 0.36 | 0.21 | 0.21 | 0.21 |
| VII | 11.65 | 11.65 | 11.65 | 13.75 | 13.75 | 13.75 | 8.69 | 8.69 | 8.69 |
| VIII | 26.21 | 26.21 | 26.21 | 27.39 | 27.39 | 27.39 | 22.03 | 22.03 | 22.03 |
| IX | 8.09 | 8.09 | 8.09 | | | | | | |
| X | | | | 14.58 | 14.58 | 14.58 | | | |
| XI | | | | | | | 6.75 | 6.75 | 6.75 |
| XII | 11.81 | 11.81 | 11.81 | | | | 8.22 | 8.22 | 8.22 |
| XIII | | | | 9.49 | 9.49 | 9.49 | | | |
| XIV | | | | | | | 4.11 | 4.11 | 4.11 |
| Determination of the viscosity of the liquid lacquer η (mPas) DIN 53019 (rotary viscosimeter) | | | | | | | | | |
| 0 h, 23° C. | 1000 | 900 | 300 | 1000 | 600 | 1000 | 800 | 700 | 400 |
| 16 h, 80° C. | | | | | | | 1200 | 1100 | 1000 |
| 7 d, 50° C. | 1400 | 1300 | 500 | 2100 | 1100 | 2000 | 3000 | 1500 | 1000 |

To prepare the lacquers, all the components with the exception of catalyst XVI were mixed in a high speed stirrer as described above. After cooling, the catalyst was stirred in and the first viscosity determination was carried out immediately. The results are summarized in Table 2.

TABLE 2

| Example | 4 A | 4 B | 4 C | 4 D | 4 E | 4 F | 4 G | 4 H | 4 J | 4 K |
|---|---|---|---|---|---|---|---|---|---|---|
| XV | 100 | 100 | 100 | 100 | 100 | 100 | 100 | 100 | 100 | 100 |
| XIV + H₂O* | 50 | 50 | 50 | 50 | 50 | 50 | 50 | 50 | 50 | 50 |
| XVI | 6 | 6 | 6 | 6 | 6 | 6 | 6 | 6 | 6 | 6 |
| III | | 12 | | | | | | | | 2.4 |
| XVII | | | 12 | | | | | | | |
| V | | | | 12 | | | | | | |
| IV | | | | | 12 | 8.4 | 6 | 3.6 | 2.4 | |
| Determination of the viscosity of the liquid lacquer Outflow time according to DIN 53211 from DIN cup 4 (seconds) | | | | | | | | | | |
| 0 h, 23° C. | 17" | 16" | 15" | 15" | 15" | 15" | 15" | 15" | 15" | 20" |
| 16 h, 80° C.+ | 163" | 20" | 16" | 20" | 16" | 17" | 18" | 18" | 18" | 86" |

*Mixture of 100 parts by weight of XIV and 1 part by weight of water
+after storage as indicated the viscosities have been determined at 23° C.

Examples 5 A to 5 C summarized in Table 3 demonstrate the stabilization of a pigmented isocyanate prepolymer containing aliphatically bound isocyanate groups. The lacquers were prepared by mixing all the components with the exception of catalyst XVI in a high speed stirrer, as described. After cooling, the catalyst is stirred in and the first viscosity determination is carried out immediately. The results are summarized in Table 3.

TABLE 3

| Example | 5 A | 5 B | 5 C |
|---|---|---|---|
| XV | 135.8 | 135.8 | 135.8 |
| VII | 8.26 | 8.26 | 8.26 |
| XVIII | 0.33 | 0.33 | 0.33 |
| XIX | 8.26 | 8.26 | 8.26 |
| XX | 57.85 | 57.85 | 57.85 |
| XVI | 0.83 | 0.83 | 0.83 |
| III | | 7.27 | |
| IV | | | 7.27 |
| Determination of the viscosity of the liquid lacquer η (mPas) DIN 53019 (rotary viscosimeter) | | | |
| 0 h, 23° C. | 500 | 400 | 450 |
| 16 h, 80° C.+ | 1050 | 400 | 500 |
| 7 d, 50° C.+ | gelled | 500 | 550 |

+the viscosities have been determined at 23° C. after storage as indicated.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A liquid or pasty, clear or pigmented composition comprising:
   (a) a polyurethane prepolymer having free isocyanate groups,
   (b) an isocyanatosilane corresponding to the formula $$R_nSi(NCO)'_{4-n}$$

wherein

R denotes an alkyl group having 1 to 6 carbon atoms and

R represents 0 or an integer from 1 to 3 in an amount sufficient to increase the storage stability of said composition and, optionally, (c) a solvent which is inert towards isocyanate groups.

2. The composition of claim 1 wherein

R denotes a methyl group and n represents the integers 2 or 3.

3. The composition of claim 1 wherein in addition to said isocyanatosilane, said composition contains aromatic or aliphatic sulphonylisocyanates as additional additives to increase the storage stability of said compositions.

4. The composition of claim 1 wherein said isocyanatosilane is present in an amount between about 0.05 and 5% by weight, based on the total weight of said composition.

5. The composition of claim 3 wherein said isocyanatosilane is present in an amount between about 0.05 and 5% by weight, based on the total weight of said composition.

6. The composition of claim 3 wherein in addition to said isocyanatosilane, said composition contains aromatic or aliphatic sulphonylisocyanates as additional additives to increase the storage stability of said compositions.

* * * * *

UNITED STATES PATENT AND TRADEMARK OFFICE
CERTIFICATE OF CORRECTION

PATENT NO. : 4,442,279
DATED : April 10, 1984
INVENTOR(S) : Rudolf Fauss, Michael Sonntag, Kuno Wagner, Kurt Findeisen and Gerhard Mennicken It is certified that error appears in the above—identified patent and that said Letters Patent is hereby corrected as shown below:

Column 4, line 64, delete "5 ml" and insert --5 mol--.

Column 7, line 5 (counting the formula), delete "R" and insert --n--.

Change the dependency of Claim 5 from "claim 3" to --claim 2--.

Change the dependency of Claim 6 from "claim 3" to --claim 2--.

Signed and Sealed this

Twenty-eighth Day of May 1985

[SEAL]

Attest:

DONALD J. QUIGG

Attesting Officer

Acting Commissioner of Patents and Trademarks